Aug. 9, 1927.

N. P. HAYES

CULINARY IMPLEMENT

Filed July 2, 1925

1,638,486

Nora P. Hayes, Inventor

Witnesses

By Richard B. Owen

Attorney

Patented Aug. 9, 1927.

1,638,486

UNITED STATES PATENT OFFICE.

NORA PHILLIPS HAYES, OF PORTERWOOD, WEST VIRGINIA.

CULINARY IMPLEMENT.

Application filed July 2, 1925. Serial No. 41,195.

This invention relates to certain new and useful improvements in culinary implements, and has particular reference to an improved scraper for removing food from dishes, pans and the like.

The primary object of the invention is to provide a scraper of the above kind which is extremely simple and durable in construction and capable of being used with facility and ease for effectively removing food from dishes, pans and the like.

A further object is to provide a scraper adapted to be worn on the hand and so constructed as to protect the fingers and the finger nails of the user when in use.

A still further object is to provide a scraper of the above kind which is comparatively simple in construction and capable of being cheaply and easily manufactured.

Other objects will appear as the nature of the invention is better understood, and the same consists in the novel form, combination and arrangement of parts hereinafter more fully described, shown in the accompanying drawing and claimed.

Figure 1:
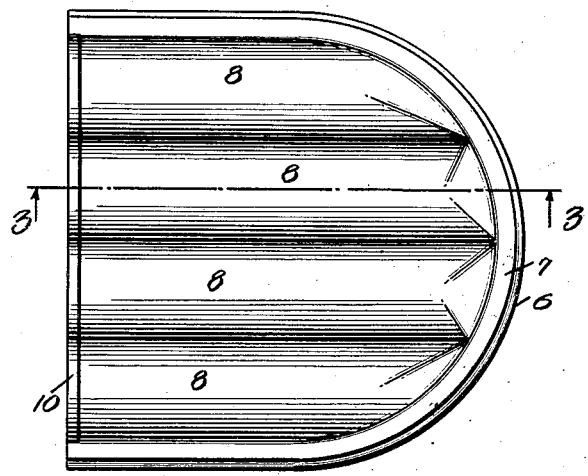
Figure 2:
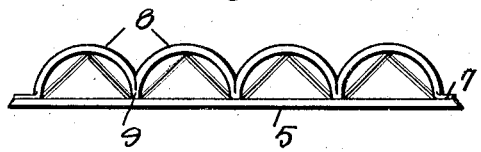
Figure 3:
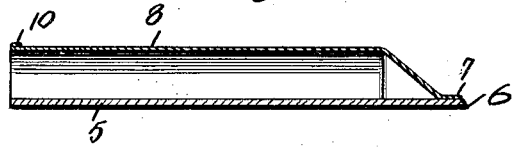

In the drawing, wherein like reference characters indicate corresponding parts throughout the several views, Figure 1 is a plan view of a scraper constructed in accordance with the present invention, Figure 2 is an end elevational view looking towards the right of Figure 1, and Figure 3 is a longitudinal sectional view taken substantially upon line 3—3 of Figure 1.

Referring more in detail to the drawing, the present invention consists of a metallic hand covering which embodies a flat face plate 5 formed of rigid sheet metal with a rounded or curved outer end as at 6, the edge of the plate 5 being preferably sharpened at this rounded end so as to facilitate removal of food from the pans, dishes and the like even though dried and stuck thereon.

The device further embodies a back plate, the margin of which at the sides and outer end of the same is rigidly secured to the margin of the face plate 5 by soldering or the like, the margins of the two plates being preferably flat and in contiguous relation as generally indicated at 7. The back plate is provided with a plurality of longitudinal corrugations or channels, preferably four, for the accommodation of the four fingers of the hand of the user. These channels are indicated at 8 and are preferably provided by crimping or corrugating the back plate so that the portions between the corrugations contact the flat face plate as indicated at 9 in Figure 2. Finger receiving sockets are thus formed which are open at the rear end of the device and closed at the forward end thereof for protecting the tips of the fingers and the finger nails of the user. The back plate is preferably constructed of lighter sheet metal, and the rear edge thereof is preferably outwardly and forwardly bent as at 10 whereby a smooth rear edge is provided upon the back plate for insuring against cutting or scratching of the user's fingers when placing the device upon the hand.

By reason of the curved form of the outer end of the implement food may be readily removed from the corners and restricted portions of the plates, pans and the like. It will be seen that a device to be worn on the hand in this manner can be utilized with greater facility and ease for the intended purpose than knives and other cutlery.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A culinary scraper including a flat rigid face plate, and a back plate having its side and outer end marginal portions secured to the corresponding portions of the face plate, said back plate being formed with a plurality of longitudinal corrugations cooperating with the face plate to form finger-receiving sockets open at the inner end of the scraper, said face plate having its outer end beveled to form a sharpened scraping edge.

2. A scraper of the character described, comprising a flat rigid face plate having one end thereof of substantially semi-circular configuration and further having the sides and curved front edge beveled to form a sharpened cutting edge, and a back plate of the same configuration as said face plate having the sides and curved front edge secured to the face plate and having the intermediate portions formed to set up a plurality of longitudinally extending corrugations of substantially semi-circular cross sectional design and having their edges abutting the adjacent surface of the face plate, to set up a plurality of finger receiving pockets, said pockets being closed at their forward ends and open at the rear edge of the face plate, substantially as and for the purpose described.

In testimony whereof I affix my signature.

NORA PHILLIPS HAYES.